United States Patent
Patel et al.

(10) Patent No.: US 7,500,793 B2
(45) Date of Patent: Mar. 10, 2009

(54) HIGH-PRESSURE/HIGH-TEMPERATURE SEALS BETWEEN GLASS FIBERS AND METALS, DOWNHOLE OPTICAL FEEDTHROUGHS CONTAINING THE SAME, AND METHODS OF PREPARING SUCH SEALS

(75) Inventors: Pragna Subhash Patel, Wyomissing, PA (US); Trung D. Nguyen, Houston, TX (US); Charles Pence Burke, Humble, TX (US); George Frank DeNardo, Jr., Schnecksville, PA (US)

(73) Assignee: Greene, Tweed of Delaware, Inc., Wilmington, DE (US)

( * ) Notice: Subject to any disclaimer, the term of this patent is extended or adjusted under 35 U.S.C. 154(b) by 0 days.

(21) Appl. No.: 11/443,871

(22) Filed: May 30, 2006

(65) Prior Publication Data

US 2006/0269211 A1   Nov. 30, 2006

Related U.S. Application Data

(60) Provisional application No. 60/685,972, filed on May 31, 2005.

(51) Int. Cl.
*G02B 6/36* (2006.01)

(52) U.S. Cl. .......................... 385/94; 385/128; 385/138

(58) Field of Classification Search ................. 385/128, 385/138, 94, 80

See application file for complete search history.

(56) References Cited

U.S. PATENT DOCUMENTS

| | | | |
|---|---|---|---|
| 4,119,363 A | 10/1978 | Camlibel et al. | |
| 4,708,429 A | 11/1987 | Clark et al. | |
| 5,026,139 A * | 6/1991 | Klainer et al. | 356/128 |
| 5,033,808 A | 7/1991 | Smith et al. | |
| 5,091,987 A | 2/1992 | MacCulloch et al. | |
| 5,177,806 A | 1/1993 | Abbott et al. | |
| 5,197,654 A * | 3/1993 | Katz et al. | 228/124.1 |
| 5,380,559 A | 1/1995 | Filas et al. | |
| 5,485,745 A | 1/1996 | Rademaker et al. | |
| 5,568,585 A | 10/1996 | Kramer | |
| 5,692,086 A | 11/1997 | Beranek et al. | |
| 5,732,175 A | 3/1998 | Fan | |
| 5,970,194 A | 10/1999 | Dunn et al. | |
| 6,016,702 A | 1/2000 | Maron | |
| 6,031,253 A * | 2/2000 | Kobayashi | 257/99 |
| 6,115,528 A | 9/2000 | Schmucker et al. | |

(Continued)

FOREIGN PATENT DOCUMENTS

WO   WO 04/001476 A1   12/2003

*Primary Examiner*—Ellen Kim
(74) *Attorney, Agent, or Firm*—Flaster/Greenberg P.C.

(57) ABSTRACT

A glass-to-meal seal for use in high temperature and high pressure environments is described. The glass-to-metal seals includes an optical fiber having a metallized portion, the metallized portion having an outer dimension; an object having a high strength, corrosion-resistant alloy, the object having an outer surface and an inner surface defining a bore, the bore having a dimension larger than the outer dimension of the metallized portion of the optical fiber; and a hardened solder material disposed between the metallized portion of the optical fiber and the inner surface of the bore, such that a hermetic seal is provided between the metallized portion of the optical fiber and the inner surface of the bore; wherein the solder includes a substance having a melting temperature greater than about 250° C.

34 Claims, 1 Drawing Sheet

U.S. PATENT DOCUMENTS

| | | |
|---|---|---|
| 6,216,939 B1 | 4/2001 | Thackara |
| 6,351,593 B1 | 2/2002 | Pollack et al. |
| 6,427,046 B1 | 7/2002 | Bickford et al. |
| 6,445,868 B1 | 9/2002 | Grunbeck et al. |
| 6,474,879 B1 | 11/2002 | Warnes et al. |
| 6,526,212 B1 | 2/2003 | Mishriky et al. |
| 6,768,825 B2 | 7/2004 | Maron et al. |
| 6,773,171 B2 | 8/2004 | Lake |
| 6,779,927 B2 | 8/2004 | Cens et al. |
| 6,796,821 B2 | 9/2004 | Cairns et al. |
| 6,827,597 B1 | 12/2004 | Metzbower et al. |
| 2001/0033729 A1 | 10/2001 | Kuroha |
| 2002/0179683 A1 | 12/2002 | Carrier et al. |
| 2003/0039458 A1* | 2/2003 | Miller et al. .................. 385/128 |
| 2004/0076393 A1* | 4/2004 | Singh et al. .................. 385/128 |
| 2005/0084227 A1 | 4/2005 | Onosato et al. |
| 2005/0224360 A1* | 10/2005 | Varghese et al. ............ 205/171 |

* cited by examiner

Section A-A

HIGH-PRESSURE/HIGH-TEMPERATURE SEALS BETWEEN GLASS FIBERS AND METALS, DOWNHOLE OPTICAL FEEDTHROUGHS CONTAINING THE SAME, AND METHODS OF PREPARING SUCH SEALS

CROSS REFERENCE TO RELATED APPLICATIONS

The present application claims priority to Provisional Application No. 60/685,972 filed May 31, 2005, the disclosure of which is incorporated herein by reference.

BACKGROUND OF THE INVENTION

In the drilling and production of oil, gas and other subterranean wells, it is often necessary to obtain at the surface, information concerning conditions within the borehole, well below the surface. For example, it is often desirable to confirm the operational condition of a piece of downhole production equipment or to determine the conditions of the downhole environment itself. Various techniques and equipment are known for use in obtaining, at the surface, information about the conditions within a borehole. One such approach has been to lower an inspection device, such as an optical sensor positioned on the end of a section of coiled tubing, into a borehole and transmit information received by the device beneath the surface to measurement equipment at the surface through the coiled tubing. Additionally, certain condition monitoring may be desirable during the drilling process itself, and/or during the operation of the well, such as monitoring of a submersible pump. Accordingly, drill heads and pumps are often outfitted with monitoring devices that are connected to the surface for the transmission of those signals to measurement equipment on the surface.

Fiber optic communication systems have become increasingly common in supplanting traditional wire-conductor communication systems in such downhole inspection devices and tools. The advent of optical fiber cable systems for use in such downhole devices and tools has created the related need for fittings, connectors, and feedthroughs capable of use with optical fiber systems. Optical fiber can be particularly vulnerable to environmental stresses and contamination.

Drilled wells can be extremely aggressive environments. The inner surface of boreholes tends to be very rough, and in addition, drilling muds, which are used to facilitate drilling, contain chemical additives which can degrade non-metallic materials. Such muds are often highly caustic with a pH as high as 12.5. Furthermore, other fluids that may be present in a borehole can include saltwater, crude oil, carbon dioxide, hydrogen sulfide and others, many of which are highly corrosive to a wide variety of materials. Downhole conditions become progressively more hostile and aggressive as the depth of the bore increases. For example, at depths of 5,000 to 8,000 meters, bottom hole temperatures can easily exceed 250° C., and pressures of well over 15,000 psi are often encountered. These types of high-pressure/high-temperature conditions can serve to amplify the corrosive and degrading nature of the downhole environment.

Such downhole conditions, including high pressure, high temperature and corrosiveness, can easily damage external or exposed downhole tool components. Internal electronics and optics need to be provided with protection from the elevated temperatures pressures and corrosive environment.

One area of particular concern regarding the potential for damage to optical fibers used in the downhole environment is the point at which an optical fiber passes from its protective outer coating (e.g., high strength metal sheathing) into the bulkhead, or external housing, of a downhole tool or device. In order for the optical fiber to serve its intended purpose and convey accurate optical signals from the downhole tool to the surface measurement instrument, all connections, seals fittings and feedthroughs associated with the fiber must be able to provide protection for the fiber from the environmental conditions without affecting its capacity to transmit unmodified optical signals. In addition, any such seals, fittings, etc. must not create stress on the optical fiber. Such external stress on an optical fiber can lead to improper transmission of the optical signal and/or physical failure of the fiber.

A number of methods for providing hermetic seals for optical fibers used in the downhole environment have been proposed. However, with the ever increasing demand for stronger, more accurate and wider bandwidth optical transmission, improved seals and connection assemblies for fiber optic cables are sought.

BRIEF SUMMARY OF THE INVENTION

The present invention relates generally to high-strength, hermetic seals between glass and metal, methods for preparing such seals, and the use of such seals in high pressure/high temperature, downhole applications. Furthermore, the present invention relates to downhole feedthrough components having a high-strength hermetic seal.

One embodiment of the present invention includes a glass-to-metal seal having an optical fiber having a metallized portion wherein the metallized portion has an outer dimension, and an object that includes a high strength, corrosion-resistant alloy, a bore extending therethrough, an inner surface defining the bore, and wherein a dimension of the inner surface is larger than the outer dimension of the metallized portion of the optical fiber, and a solder that includes a substance having a melting temperature greater than about 250° C., and wherein the solder is disposed between the metallized portion of the optical fiber and the inner surface of the object.

Further aspects of the present invention include wherein the object has a cross-sectional configuration which is generally cylindrical and the bore extends axially through the object; wherein the solder extends along the entire length of the inner surface of the bore of the object; wherein the optical fiber includes a glass fiber having a glass core with a protective coating on an outer surface of the glass core, and wherein the metallized portion includes an area of the glass core wherein the protective coating has been removed, and at least one metallic layer deposited on the area of the glass core; wherein the at least one metallic layer includes a metal selected from the group consisting of titanium, platinum, nickel, chromium, and mixtures and alloys thereof; wherein the at least one metallic layer includes an outermost layer including gold; wherein the solder includes a eutectic gold and tin material; wherein the eutectic gold and tin material includes about 80% by weight gold and about 20% by weight tin; wherein the metallized portion includes a layer of gold, a layer of platinum, and a layer of titanium; wherein the gold layer has a thickness of about 600 to about 1,100 Angstroms, the platinum layer has a thickness of about 3,600 to about 4,400 Angstroms, and the titanium layer has a thickness of about 100 to about 400 Angstroms; wherein the outermost layer is gold and the platinum layer is disposed between the gold layer and titanium layer; wherein the gold layer has a thickness of about 700 to about 1,100 Angstroms, the platinum layer has a thickness of about 3,800 to about 4,100 Angstroms, and the titanium layer has a thickness of about 150 to about 300 Angstroms; wherein the outermost layer is gold and the platinum layer is disposed between the gold layer and titanium layer; wherein the metallized portion includes a layer of gold, and a layer of chromium; wherein the gold layer has a thickness of about 600 to about 1,100 Angstroms, and the chromium layer has a thickness of about 500 to about 800 Angstroms; wherein the outermost layer is gold; wherein the high strength, corrosion-resistant alloy includes an alloy of nickel and chromium; wherein at least a portion of the inner surface of the object is gold plated; wherein at least a portion of the inner surface of the bore is gold-plated; wherein the solder is subjected to a stress relief treatment includes a temperature cycling process; wherein the temperature cycling process includes heating the seal to about 200° C., cooling the seal to about −40° C., and heating the seal to about 200° C.; wherein the temperature cycling process is repeated at least once; and wherein the seal is held at each temperature in the cycling process for about an hour.

Another embodiment of the present invention includes a glass-to-metal seal including an optical fiber having a glass core with a protective coating on an outer surface of the glass core, and a metallized portion, the metallized portion having an outer dimension, including an area of the glass core wherein the protective coating has been removed, and one or more metallic layers deposited on the area of the glass core, wherein at least one of the one or more metallic layers including a metal selected from the group consisting of titanium, platinum, nickel, chromium, and mixtures and alloys thereof, and at least one of the one or more metallic layers includes an outermost layer including gold, an object including a cross-sectional configuration which is generally cylindrical having a high strength, corrosion-resistant alloy of nickel and chromium, the object having a bore extending axially through the housing, an inner surface with a dimension larger than the outer dimension of the metallized portion of the optical fiber, and wherein at least a portion of the inner surface of the housing is gold plated, and a solder including about 80% by weight gold, about 20% by weight tin, and wherein the solder is disposed between the metallized portion of the optical fiber and the inner surface of the housing, such that a hermetic seal is provided between the metallized portion of the optical fiber and the inner surface of the housing, and wherein the solder has been subjected to a stress relief treatment including a temperature cycling process.

Yet another embodiment of the present invention includes a method for providing a glass-to-metal seal for high-pressure/high-temperature, downhole environments, the method includes (a) providing an optical fiber having a metallized portion, the metallized portion having an outer dimension, (b) providing a housing that includes a high strength, corrosion-resistant alloy and having a bore extending therethrough, the housing having an inner surface defining the bore with a dimension larger than the outer dimension of the metallized portion of the optical fiber, (c) positioning the metallized portion of the optical fiber within the bore, and (d) forming a hermetic, hardened solder seal between the metallized portion of the optical fiber and the inner surface of the housing, wherein the solder seal includes a eutectic gold and tin material.

Further aspects of the present embodiment include wherein the housing has a generally cylindrical cross-sectional configuration and the bore extends axially through the housing; wherein the high strength, corrosion-resistant alloy includes an alloy of nickel and chromium; wherein at least a portion of the inner surface of the housing is gold plated; wherein at least a portion of the inner surface of the housing is gold plated; providing an optical fiber which includes a glass fiber having a glass core with a protective coating disposed on an outer surface of the glass core, removing a portion of the protective coating, and depositing one or more metallic layers on the portion of the glass core where the protective coating has been removed to form the metallized portion of the optical fiber; wherein at least one of the one or more metallic layers includes a metal selected from the group consisting of titanium, platinum, nickel chromium, and mixtures and alloys thereof, and at least one of the one or more metallic layers includes an outermost layer including gold; wherein the gold in the eutectic gold and tin material is present in an amount of about 80% by weight and the tin is present in an amount of about 20% by weight; the step of subjecting the solder seal to a stress relief treatment including a temperature cycling process; wherein the temperature cycling process includes heating the seal to about 200° C., cooling the seal to about −40° C., and heating the seal to about 200° C.; wherein the temperature cycling process is repeated at least once; and wherein the seal is held at each temperature in the cycling process for about an hour.

A further embodiment of the present invention includes a downhole optical feedthrough including a seal produced according to the method of (a) providing an optical fiber having a metallized portion, the metallized portion having an outer dimension, (b) providing a housing including a high strength, corrosion-resistant alloy and having a bore extending therethrough, the housing having an inner surface defining the bore with a dimension larger than the outer dimension of the metallized portion of the optical fiber, (c) positioning the metallized portion of the optical fiber within the bore, and (d) forming a hermetic, hardened solder seal between the metallized portion of the optical fiber and the inner surface of the housing, wherein the solder seal includes a eutectic gold and tin material.

BRIEF DESCRIPTION OF THE SEVERAL VIEWS OF THE DRAWINGS

The foregoing summary, as well as the following detailed description of the embodiments of the invention, will be better understood when read in conjunction with the appended drawings. For the purpose of illustrating the invention, there are shown in the drawing an embodiment of the present invention. It should be understood, however, that the invention is not limited to the precise arrangements and instrumentalities shown. In the drawings.

DETAILED DESCRIPTION OF THE INVENTION

Reference will now be made in detail to the invention and the presently described embodiments thereof, examples of which are illustrated in the accompanying drawings. Although the disclosure herein refers to certain illustrated embodiments, it is to be understood that these embodiments are presented by way of example and not by way of limitation.

Figure 1:
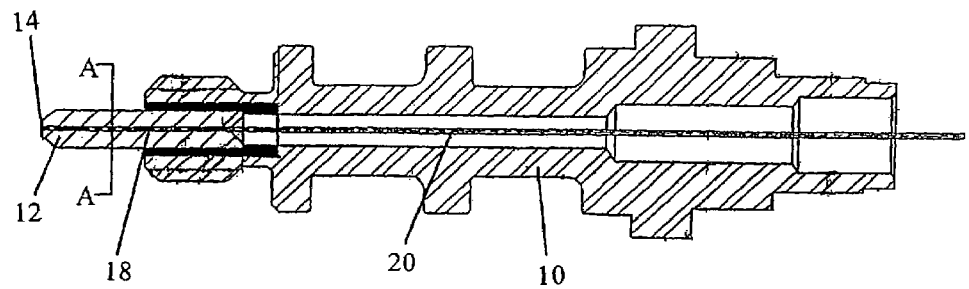
FIG. 1 is a cross-sectional view of an optical fiber feedthrough component with a brazed seal in accordance with one embodiment of the present invention.
Figure 2:
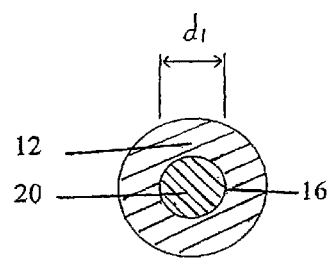
FIG. 2 is a cross-sectional view of FIG. 1 taken along section A-A.
Figure 3:
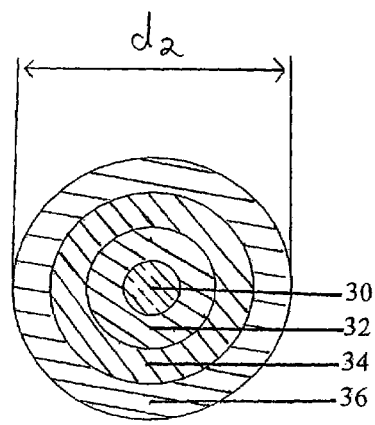
FIG. 3 is a cross-sectional view of the optical fiber of FIG. 1.

In an embodiment of the present invention, as shown in FIG. 1, a feedthrough housing 10 is configured to house an object 12. The object 12 has a bore 14 that extends through the object and can be coaxial with the feedthrough housing 10. As shown in FIG. 2, the object 12 has an inner surface 16 that defines the bore 14. The overall size or dimension of the bore (e.g., diameter $d_1$ when the bore is circular as shown in FIG. 2) is typically greater than an outer dimension of the metallized portion 18 of the glass fiber 20 (i.e., diameter $d_2$ of the metallized portion of the glass fiber as shown in FIG. 3). The object 12 can be of any configuration, but is preferably cylindrical such that it fits within a cylindrical opening in the housing 10. It should be understood that the object 12 of the housing 10 are preferably configured so as to work together as noted herein.

The high pressure/high temperature seal provided in accordance with the present invention includes a solder or solder material. In an embodiment of the present invention, the solder material is selected such that the coefficient of thermal expansion of the solder material is as close as possible to the coefficient of thermal expansion of the optical fiber core, over as wide a range to temperatures as possible, but most preferably, at least at the elevated temperatures encountered in downhole environments. Solder materials in accordance with the present embodiment include metals and alloys which are capable of withstanding temperatures and pressures encountered in downhole environments. Solder materials having a melting temperature above about 250° C., particularly above about 275° C., and more particularly a melting temperature of at least about 280° C. are preferred. Suitable solder materials cause minimal stress on the optical fiber while achieving high tensile strength (e.g., >30,000 psi) and hermetic sealing with a helium leak rate of $1 \times 10^{-9}$ or better. Preferred solder materials in accordance with the present invention include alloys based on silver and gold. The solder can include a gold and tin eutectic material, and more preferably a material composed of gold in an amount of about 80% by weight and tin in an amount of about 20% by weight. In an embodiment, the solder material can extend the entire length of the inner surface of the object.

The glass-to-metal seal in accordance with the present invention includes an object having a metal. In embodiments of the present invention, the object is configured to be connected to a feedthrough housing, as shown for example in FIG. 1. The object can be configured to have a configuration that is generally cylindrical or with a cross-sectional configuration in a plane perpendicular to its axial direction that is generally circular in shape. Feedthrough housings for use in downhole environments are preferably tubular or cylindrical in shape. However, feedthrough housings in accordance with various embodiments of the present invention may have multiple varying borehole diameters throughout the housing and outer dimensions. Furthermore, the housing may include a number of external annular rings or protrusions for fixing the location of the feedthrough as it enters a downhole tool housing or bulkhead (not shown). Thus, in the present application, reference to "generally cylindrical" or "cylindrical" is not intended to depict a perfect cylinder or tube but rather, reflects a housing element having two opposing ends along an axial direction and an outer circumference which may vary along the length of the housing, wherein the housing also includes a bore that extends from one end to the other along the axial direction which is preferably aligned with the bore in the object.

The feedthrough housing 10 can have any external shape or contour. For example, the cross-sectional shape of a feedthrough housing in a plane perpendicular to its axial direction can be circular, oval, square, rectangular, or any other desired shaped.

The metal object to which the optical fiber is sealed in the present embodiment is of high strength, corrosion-resistant alloy. As used herein, the term "high strength" refers to alloys which have a tensile strength greater than standard steel alloys and preferably above about 200,000 psi, more preferably above about 250,000 psi, and most preferably above about 275,000 psi. The high strength, corrosion-resistant material can include a metal alloy which is capable of withstanding the temperatures and pressures encountered in the downhole environment while minimizing corrosion or deformation. As used herein, references to metals which are suitable for use in and can withstand downhole environments (without corrosion or deformation), refers to the ability of the metal material to perform its protective function without failure, but is not meant to indicate that zero corrosion and/or zero deformation occurs. In embodiments of the present invention, the high strength, corrosion-resistant material preferably includes a nickel-based alloy, and more preferably a nickel and chromium alloy, and most preferably a nickel-based alloy that includes Inconel® 718. Other suitable preferred alloys include Hastelloy® C-22 and C-276 as well as various other Inconel® alloys.

The optical fibers suitable for use in the seals and methods of the present invention include any fiber capable of transmitting an optical signal. In embodiments of the present invention, the optical fiber is a glass single-mode fiber. Generally, the glass single mode fibers capable of use in the seals and methods of the present invention will include a glass core surrounded by an additional glass cladding further surrounded by a protective coating such as a plastic or silane-based coating. The glass fiber can be metallized on a portion of the glass, from which the protective coating has been removed, which will be in physical contact with the solder material.

In embodiments of the present invention, wherein the glass fiber is metallized, the protective coating is removed in that portion of the optical fiber to expose the bare glass fiber. The protective coating can be removed in any known manner such as via chemical or mechanical processes or any methods to be developed. The bare glass fiber is then subjected to metallization wherein a metal layer is deposited on the glass fiber to provide increased compatibility between the glass and the solder material. Preferred metals for the preparation of such metallization layers include titanium, platinum, nickel, chromium, and mixture and alloys thereof. In embodiments of the present invention, the metallization of the glass fibers includes a subsequent deposition of an outer layer of gold on the metal previously deposited on the glass fiber. The metallization of the glass fiber can be accomplished in a variety of ways, including all known methods of plating, including, for example, ion-assisted plating under vacuum conditions, high vacuum sputtering, chemical vapor, and/or plasma deposition techniques, and/or suitable sol-gel metallic coating processes. Preferred methods of plating the glass fiber include ion-assisted plating under vacuum conditions and high vacuum sputtering.

In certain embodiments of the present invention, it is desirable to provide a gold plating to a surface of the metal object with which the solder will be in contact. Thus, at least a portion of the inner surface of the object defining the bore in the metal object is preferably gold-plated where contact will be made with the solder material. Gold-plating in accordance with such embodiments of the present invention can similarly be carried out by any known means of gold-plating or any methods to be developed.

In an embodiment of the present invention as illustrated in FIG. 3, the glass fiber 30 has a metallized portion that includes titanium 32, platinum 34, and gold 36 layers with the platinum layer disposed between the titanium and gold layers, and the titanium layer in contact with the glass fiber. The titanium layer has a thickness of from about 100 to about 400 Angstroms and preferably from about 150 to about 300 Å. The platinum layer has a thickness of from about 3600 to about 4400 Å and preferably from about 3800 to about 4100 Å. The gold layer has a thickness of from about 600 to about 1100 Å and preferably from about 700 to about 1100 Å. The overall diameter $d_2$ defines the outer dimension of the metallized portion of the optical fiber.

Alternative embodiments can include platinum disposed between chrome and gold layers with a gold layer as the outermost layer, and dual layer combinations such as titanium and gold layers, and chrome and gold layers, with the gold layer as the outermost layer. In a chrome, platinum, and gold layer embodiment, the chrome layer can have a thickness from about 100 to about 400 Å and preferably from about 150 to about 300 Å. The platinum layer can have a thickness from about 3600 to about 4400 Å and preferably from about 3800 to about 4100 Å. The gold layer can have a thickness from about 600 Å to about 1100 Å and preferably from about 700 to about 1100 Å. In a titanium and gold layer embodiment, the titanium layer can have a thickness from about 500 to about 800 Å and preferably from about 550 to about 750 Å. The gold layer can have a thickness from about 600 to about 1100 Å and preferably from about 700 to about 1100 Å. In a chrome and gold layer embodiment, the chrome layer can have a thickness from about 500 to about 800 Å and preferably from about 550 to about 750 Å. The gold layer can have a thickness from about 600 to about 1100 Å and preferably from about 700 to about 1100 Å.

In the methods according to the present invention, the solder material can be brazed to form a hermetic seal between the optical fiber and the metal object. In embodiments of the methods according to the present invention, the brazing is carried out using induction brazing. The induction brazing can be carried out using an Ameritherm Induction Heating Hotshot Model 1 kW at a frequency range of about 150-400 kHz and a power of less than about 10 watts.

Figure 4:
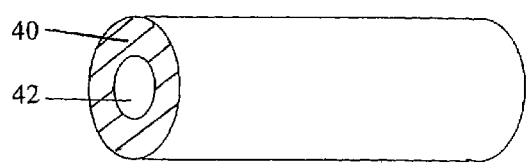
FIG. 4 is perspective view of a solder perform in accordance with an embodiment of the present invention.

In certain embodiments of the present invention, the solder can be in the form of a solder perform as shown in FIG. 4. Suitable solder preforms can have a size and shape (e.g., cylindrical 40) complementary to the bore in the housing, and also a generally centered axial bore 42 through the preform itself. The axial bore 42 through the preform 40 is sized to accept the metallized portion of an optical fiber. Thus, in embodiments of the method according to the present invention, a solder preform 40 can be placed in the bore of the object, and the metallized portion of the optical fiber can be placed in the axial bore 42 of the preform, in either order, and the preform 40 can be melted to form a hermetic seal. More preferably, the solder preform 40 is brazed as described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A glass-to-metal seal comprising:
    an optical fiber having a glass core and a metallized portion bonded thereon as a result of ion-assisted plating, the metallized portion having an outer dimension;
    an object comprising:
        a high strength, corrosion-resistant alloy;
        a bore extending therethrough; an inner surface defining the bore; and
        wherein a dimension of the inner surface is larger than the outer dimension of the metallized portion of the optical fiber; and
    a solder comprising:
        a substance having a melting temperature greater than about 250° C.; and
        wherein the solder is disposed between the metallized portion of the optical fiber and the inner surface of the object wherein the glass to metal seal is suitable for use in a high temperature, high pressure environment.

2. The seal according to claim 1, wherein the object comprises a generally cylindrical configuration and the bore extends axially through the object.

3. The seal according to claim 1, wherein the solder extends along the entire length of the inner surface of the bore of the object.

4. The seal according to claim 1, wherein the optical fiber comprises:
    a glass fiber having:
        a glass core with a protective coating on a portion of the outer surface of the glass core and wherein an area of the outer surface of the glass core has no protective coating thereon, and
        wherein the metallized portion is located on:
            the area of the glass core wherein there is no protective coating, and at least one metallic layer is deposited thereon.

5. The seal according to claim 4, wherein the at least one metallic layer comprises a metal selected from the group consisting of titanium, platinum, nickel, chromium, and mixtures and alloys thereof.

6. The seal according to claim 5, wherein the at least one metallic layer comprises an outermost layer comprising gold.

7. The seal according to claim 1, wherein the solder comprises a eutectic gold and tin material.

8. The seal according to claim 7, wherein the eutectic gold and tin material comprises about 80% by weight gold and about 20% by weight tin.

9. The seal according to claim 1, wherein the metallized portion comprises:
    an outer layer of gold defining the outer dimension;
    a middle layer of platinum; and
    an inner layer of titanium,
    wherein the inner layer of titanium is in contact with the optical fiber.

10. The seal according to claim 9, wherein the gold layer has a thickness of about 600 to about 1,100 Angstroms, the platinum layer has a thickness of about 3,600 to about 4,400 Angstroms, and the titanium layer has a thickness of about 100 to about 400 Angstroms.

11. The seal according to claim 9, wherein the gold layer has a thickness of about 700 to about 1,100 Angstroms, the platinum layer has a thickness of about 3,800 to about 4,100 Angstroms, and the titanium layer has a thickness of about 150 to about 300 Angstroms.

12. The seal according to claim 1, wherein the metallized portion comprises:
    an outer layer of gold defining the outer dimension; and
    an inner layer of chromium,
    wherein the inner layer of chromium is in contact with the optical fiber.

13. The seal according to claim 12, wherein the gold layer has a thickness of about 600 to about 1,100 Angstroms, and the chromium layer has a thickness of about 500 to about 800 Angstroms.

14. The seal according to claim 1, wherein the high strength, corrosion-resistant alloy comprises an alloy of nickel and chromium.

15. The seal according to claim 14, wherein at least a portion of the inner surface of the object is gold plated.

16. The seal according to claim 1, wherein at least a portion of the inner surface of the bore is gold plated.

17. The seal according to claim 1, wherein the solder is the result of a method including a stress relief treatment comprising a temperature cycling process.

18. The seal according to claim 17, wherein the temperature cycling process comprises:
heating the seal to about 200° C.;
cooling the seal to about −40° C.; and
heating the seal to about 200° C.

19. The seal according to claim 18, wherein the temperature cycling process is repeated at least once.

20. The seal according to claim 18, wherein the seal is held at each temperature in the cycling process for about an hour.

21. A glass-to-metal seal comprising:
an optical fiber having:
a glass core with a protective coating on an outer surface of the glass core; and
a metallized portion, the metallized portion having an outer dimension, comprising:
an area of the glass core wherein the protective coating has been removed; and
one or more metallic layers deposited on the area of the glass core, wherein at least one of the one or more metallic layers comprises:
a metal selected from the group consisting of titanium, platinum, nickel, chromium, and mixtures and alloys thereof, and
at least one of the one or more metallic layers comprises an outermost layer comprising gold, wherein the metallized portion is an ion-assisted plating bond on the glass core;
an object comprising a generally cylindrical configuration having:
a high strength, corrosion-resistant alloy of nickel and chromium, the object having:
a bore extending axially through the housing,
an inner surface with a dimension larger than the outer dimension of the metallized portion of the optical fiber; and
wherein at least a portion of the inner surface of the housing is gold plated; and a solder comprising:
about 80% by weight gold;
about 20% by weight tin; and
wherein the solder is disposed between the metallized portion of the optical fiber and the inner surface of the housing, such that a hermetic seal is provided between the metallized portion of the optical fiber and the inner surface of the housing; and
wherein the solder has been subjected to a stress relief treatment comprising a temperature cycling process.

22. A method for providing a glass-to-metal seal for high-pressure/high-temperature, downhole environments, the method comprising:
(a) providing an optical fiber having a glass core and a metallized portion, the metallized portion having an outer dimension;
(b) providing a housing comprising a high strength, corrosion-resistant alloy and having a bore extending therethrough, the housing having an inner surface defining the bore with a dimension larger than the outer dimension of the metallized portion of the optical fiber;
(c) positioning the metallized portion of the optical fiber within the bore; and
(d) forming a hermetic, hardened solder seal between the metallized portion of the optical fiber and the inner surface of the housing by induction brazing, wherein the solder seal comprises a eutectic gold and tin material.

23. The method according to claim 22, wherein the housing has a generally cylindrical cross-sectional configuration and the bore extends axially through the housing.

24. The method according to claim 22, wherein the high strength, corrosion-resistant alloy comprises an alloy of nickel and chromium.

25. The method according to claim 24, wherein at least a portion of the inner surface of the housing is gold plated.

26. The method according to claim 22, wherein at least a portion of the inner surface of the housing is gold plated.

27. The method according to claim 22, further comprising:
providing an optical fiber which comprises a glass fiber having a glass core with a protective coating disposed on an outer surface of the glass core;
removing a portion of the protective coating; and
depositing, by ion-assisted plating, one or more metallic layers on the portion of the glass core where the protective coating has been removed to form the metallized portion of the optical fiber.

28. The method according to claim 27, wherein at least one of the one or more metallic layers comprises a metal selected from the group consisting of titanium, platinum, nickel chromium, and mixtures and alloys thereof, and at least one of the one or more metallic layers comprises an outermost layer comprising gold.

29. The method according to claim 22, wherein the gold in the eutectic gold and tin material is present in an amount of about 80% by weight and the tin is present in an amount of about 20% by weight.

30. The method according to claim 22, further comprising subjecting the solder seal to a stress relief treatment comprising a temperature cycling process.

31. The method according to claim 30, wherein the temperature cycling process comprises:
heating the seal to about 200° C.;
cooling the seal to about −40° C.; and
heating the seal to about 200° C.

32. The method according to claim 31, wherein the temperature cycling process is repeated at least once.

33. The method according to claim 31, wherein the seal is held at each temperature in the cycling process for about an hour.

34. A downhole optical feedthrough comprising a seal produced according to the method of claim 22.

* * * * *